United States Patent [19]

Nishino et al.

[11] 3,872,013
[45] Mar. 18, 1975

[54] BACTERICIDAL WATER PURIFIER FOR DECHLORINATED WATER

[75] Inventors: Atsushi Nishino; Yukihide Iura; Masayoshi Kubo; Motosi Tateisi, all of Kadoma, Japan

[73] Assignee: Matsushita Electric Industrial Company, Osaka, Japan

[22] Filed: Nov. 8, 1973

[21] Appl. No.: 414,133

[30] Foreign Application Priority Data
Nov. 9, 1972 Japan.............................. 47-112696
Aug. 11, 1973 Japan.............................. 48-90385
Aug. 11, 1973 Japan.............................. 48-90386

[52] U.S. Cl................... 210/317, 210/501, 210/502
[51] Int. Cl............................................ B01d 31/00
[58] Field of Search ........... 210/321, 501, 502, 193, 210/75, 506, 317; 117/160

[56] References Cited
UNITED STATES PATENTS
2,017,456  10/1935  Gudmundsen.................. 210/501 X
2,937,752  5/1960  Peschere........................ 210/193 X
3,246,767  4/1966  Pall et al........................ 210/506 X
3,327,859  6/1967  Pall.................................... 210/266

*Primary Examiner*—Frank A. Spear, Jr.

[57] ABSTRACT

Porous sheets of a water insoluble material such as a synthetic fiber coated with a bactericidal substance such as a sparingly soluble halide of a Group IB heavy metal are placed between the activated carbon layer and outlet of a water purifier. Additional provision of calcium carbonate granules in the purifier is effective in improving the bactericidal efficiency.

3 Claims, 7 Drawing Figures

PATENTED MAR 18 1975 3,872,013

BACTERICIDAL WATER PURIFIER FOR DECHLORINATED WATER

The present invention relates to a water purifier and particularly to a water purifier for drinking water having one or more bactericidal membranes which inhibit the propagation of bacteria in the purifier after removal of chlorine or its derivatives from the supplied city water.

In recent years, various types of water purifiers have been put on the market in large quantities for use in homes and shops to improve city water or the like in respect to tastes and odors. Most of them are designed to remove chlorine or its derivatives in the supplied water by an absorbent such as activated carbon. Consequently, the treated water no longer has any bactericidal power, which often, especially when the purifier is left unused for a few days, gives rise to the propagation of bacteria in the water retained in the purifier. To prevent such contamination by bacteria, water purifiers for treating drinking water should be provided with some bactericidal means, but the fact is that no water purifier so far on the market has met this requirement.

It is therefore an object of the present invention to provide a water purifier which has an excellent and lasting bactericidal effect on dechlorinated water without impairing tastes and odors of the treated water.

Briefly stated, a water purifier according to the invention has one or more bactericidal membranes, comprising a porous substratum sheet made of water and chemicals resistant material such as a synthetic fiber, and porous coatings of a sparingly water soluble bactericidal substance selected from copper, silver, gold, and their chlorides, bromides and iodides cohered on the surfaces of the substratum sheet, placed between the filter and water outlet. The purifier may further comprise granules of an alkaline substance such as calcium carbonate to enhance the bactericidal efficiency of a heavy metal ion.

The water purifier of the invention features many desirable properties such as excellent and long-lasting bactericidal effect, high resistance and durability of the bactericidal membrane against water pressure changes, low restriction to water flow, and no need for enlargement of existing purifier or complicated operation.

These and other objects, features and advantages of the invention will become more clear from the following detailed description taken in conjunction with the accompanying drawings, in which.

Figure 1:
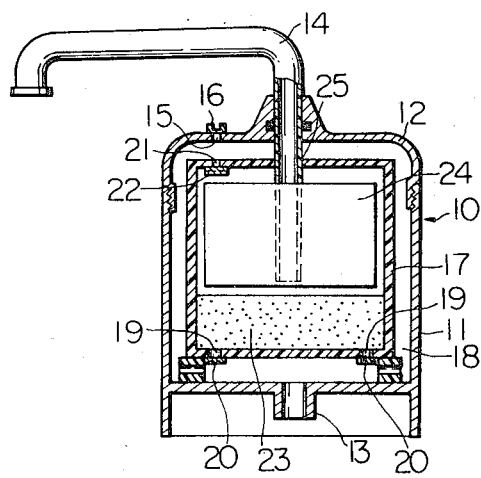
FIG. 1 is a longitudinal sectional view of a water purifier in accordance with the invention.
Figure 2:
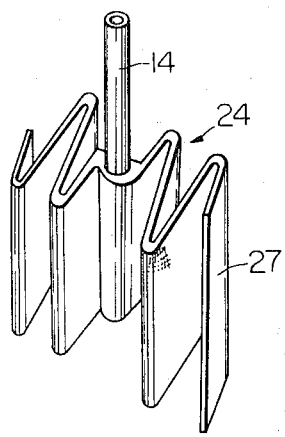
FIG. 2 is a schematic perspective view of the filter cloth unit of the purifier shown in FIG. 1.
Figure 3:
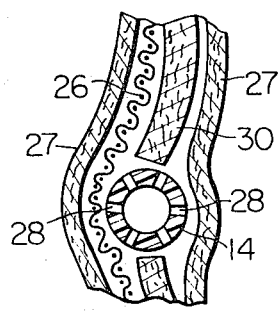
FIG. 3 is a schematic cross-sectional view of the filter cloth unit of FIG. 2.

Referring to FIG. 1, a water purifier according to the invention is assembled in a case 10 which is a combination of a cylindrical body 11 and a cap member 12. The body 11 has a water inlet 13 at its bottom to be connected to a city water faucet, and the cap member 12 has an outlet pipe 14 and an air relief opening 15 covered with a plug 16. In the case 10 is installed a cartridge 17 in a manner to provide a space 18 between the cartridge 17 and the interior surface of the case 10. The cartridge 17 has water inlet openings 19 at the bottom, which openings 19 may be sealed before use by seal members 20 formed of a water soluble material, and an air relief opening 21 at the ceiling covered with a filter member 22, allowing only air and water to pass through it. The cartridge 17 contains finely powdered activated carbon 23 and a filter unit 24 to which the outlet pipe 14 is connected through an opening 25 at the ceiling of the cartridge 17. The filter unit 24, which is preferably folded many times as shown in FIG. 2 to have an as large surface area as possible in a limited space in the cartridge 17, comprises, as seen from FIG. 3, one or more porous supporting members 26, for example a large mesh net or lattice, filter cloths 27 and at least one porous bactericidal membrane 30 in a sandwiched construction. A portion of the outlet pipe 14 inserted into the filter unit 24 has many tiny openings 28 to let in filtered water.

Figure 4:
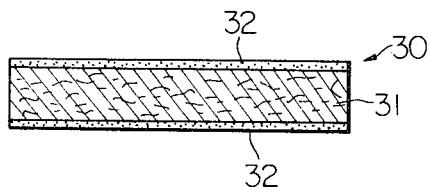
FIG. 4 is a schematic sectional view of a bactericidal membrane.

It is a feature of a water purifier according to the invention that the bactericidal membranes 30 are placed in the filter unit 24 so that the membranes 30 are soaked in the dechlorinated and filtered water. A bactericidal membrane 30 shown in FIG. 4 comprises a porous substratum sheet 31 and coatings of a bactericidal substance 32 formed porously on the surfaces of the sheet 31.

It is known that traces of the ions of heavy metals such as mercury, silver, copper, gold and lead act as bactericides. Therefore, these metals can be used as bactericides for water either in the form of pure metal or in the form of sparingly soluble compounds except harmful ones. Considering the solubility in water and the effect on tastes and odors of the treated water, examples of selected bactericidal substances for the membrane 30 are silver, copper, gold, and their halides, oxides and sulfides; the most preferable among them being silver chloride.

A substance selected from these examples may be introduced into a water purifier by mixing it with the activated carbon 23, but the result is considered unpromising. The reason is that the mixed substance separates from the activated carbon 23 and settles down at the bottom of the cartridge 17 due to its markedly higher specific gravity compared with that of activated carbon, and that chlorine ions absorbed in the activated carbon 23 strongly hinder the dissolution of the mixed substance, when it is a preferable chloride, by the common-ion effect.

Therefore, we have contemplated porous sheets of water and chemicals resistant materials as the substratum for the bactericidal substance in place of activated carbon. The sheet 31 must be harmless and should have sufficient physical strength besides the mentioned chemical property. Some metals such as silver, gold and platinum may be used, but they are all too costly for ordinary use. Various synthetic resins and fibers, cotton, glass, asbestos and unglazed pottery are more inexpensive examples of the sheet material. Considering porosity, formability, flexibility, and adaptability to the coatings 32, the suitable form of the sheet 31 is cloth, non-wooven cloth or paper, and the most prefered is a nonwooven cloth of a synthetic fiber of nylon, rayon, polyester fibers, acrylonitrile fibers, acetate fibers, polypropylene fibers, partially acetal-formed polyvinyl alcohol fibers or blends of these fibers. Ordinary cloths, canvas and Japanese paper may also be used.

When one of the above mentioned pure metals is employed as the bactericidal substance of the membrane 30, the metal can work as the substratum 31 and as the coatings 32 simultaneously if it is formed with many openings like a net.

The width and length of the sheet 31 are scarecely limited because the finished membrane 30 is cut into pieces of desired shape and size, but the thickness should be determined depending on the kind of the sheet and design of a water purifier. The preferable thickness is generally within a range of about 0.01 to 5 mm. Although a larger thickness may be employed, a larger space in the cartridge 17 is required, and the resistance of the membrane 30 to water flow is increased, while a sheet 31 thinner than 0.01 mm cannot have the necessary strength to withstand the water pressure changes and various shocks taking place during long usage. As for the coatings 32, the preferred thickness ranges from 0.4 to 50 microns.

The coatings 32 of a sparingly water soluble substance such as silver chloride are formed with uniform thickness and adequate porosity by an ingenious and efficient method as described below.

The sheet 31 is at first immersed in an about 10 percent aqueous solution of silver nitrate to coat and impregnate it with the solution, then immersed in an about 5 percent aqueous solution of sodium chloride to convert the coated and impregnated silver nitrate into silver chloride. After removal from the solution, the coated sheet is washed with water and air dried. Similar silver chloride coatings may alternatively be formed by immersing the sheet 31 in an about 5 percent aqueous ammonia solution containing about 4 percent silver chloride as dissolved complex salts, and drying the coated and impregnated sheet to evaporate ammonia and water. Other conventional methods of forming thin coatings such as vapor deposition and application of a dispersion of fine particles too may be employed to form the coatings 32.

It is preferable to place the membranes 30 so as to face the entire interior surfaces of the filter cloth 27 from the viewpoint of bactericidal effect, but some portions of the interior space of the filter unit 24 except for the portions near the outlet pipe 14 may be left vacant of the membrane 30.

When city water is supplied into the purifier through the inlet 12, the water flows into the cartridge through the openings 19 dissolving the seal members 20. By the turbulent and upward water flow, the activated carbon 23 is stirred and carried to the outer surface of the filter cloth 27, forming a layer on the surface. The chlorine ions, hypochlorous acid, and other impurity matters in the supplied water are absorbed in the thus formed layer of activated carbon, and the resulting purified water, which has been deprived of bactericidal power, comes into the inner space of the filter unit 24 through the filter cloth 27. The purified water flows along and through the membranes 30, dissolving a trace of the coated heavy metal compound 32. As a result, the water recovers an effective bactericidal power by the action of the dissolved heavy metal ion, so that bacteria contamination of the purified water, the cartridge 17 and the outlet pipe 14 is effectively prevented.

A measurement of $Ag^+$ ion concentration in the purified water obtained from the water purifier of FIG. 1 after 8 hrs. from the start of operation gave the value of 23 ppb. Then, specially prepared water containing 30,000 bacteria per ml was put into the purifier and left there for 6 hrs. A determination after 6 hrs. revealed that the bacteria in the water had been completely destroyed and that the $Ag^+$ concentration of 23 ppb or the water purifier of the invention had the expected bactericidal effect.

The water purifier of the invention maintains its excellent bactericidal power substantially unchanged for months even when used under severe water pressure changes to the extent of a range from 0.3 to 20 kg/cm². The long-lasting effectiveness mainly depends on the strong cohesion of the coatings 32 to the sheet 31 and a large effective surface area of the coatings 32.

It should be noted that the supporting member 26 may be used at the same time as the substratum for the bactericidal substance if the thickness and porosity are determined properly.

Figure 6:
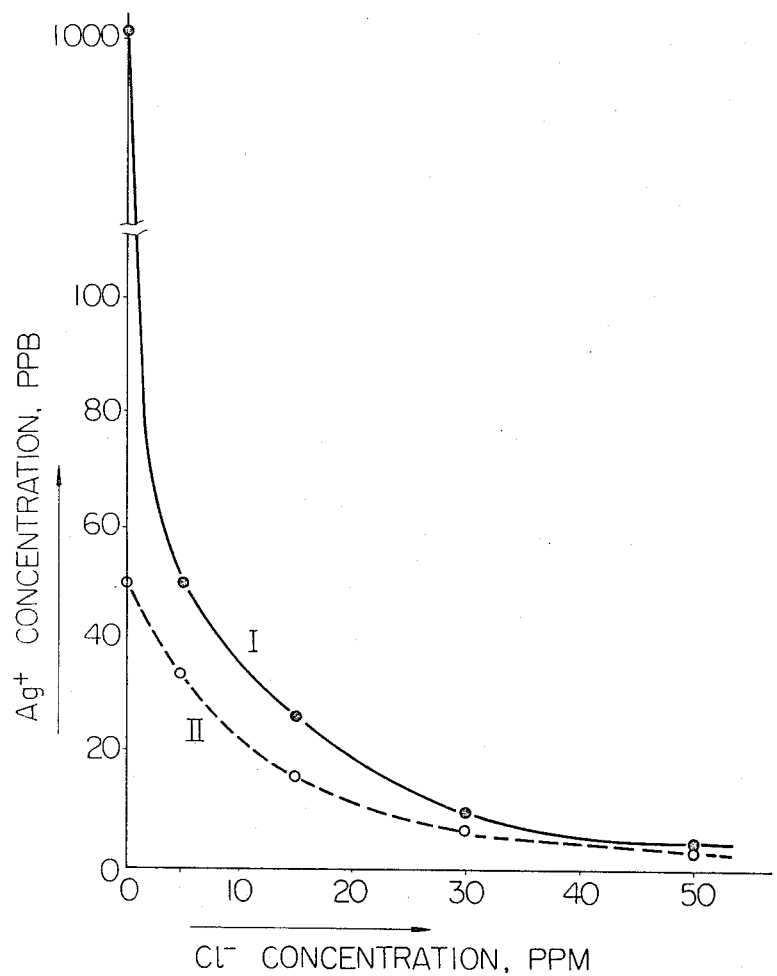
FIG. 6 is a graph of $Cl^-$ concentration vs. $Ag^+$ concentration in water.

When silver chloride, which is considered most preferable, is used as the coating material for the membrane 30, the $Ag^+$ concentration in the treated water depends on the $Cl^-$ concentration and pH value of the water besides the water flow rate and the quantity of silver chloride. The curve I in FIG. 6 represents the relationship of the $Ag^+$ concentration in the treated water to the $Cl^-$ concentration in the supplied water. As seen from the graph, the $Ag^+$ concentration increases as the $Cl^-$ concentration decreases. This tendency should be considered carefully because the $Ag^+$ concentration in drinking water is generally required by law to be below a certain value; for example, the U.S. Public Health Service Drinking Water Standards specify that the $Ag^+$ concentration shall be below 50 ppb. From FIG. 6, $Ag^+$ more than this limit is anticipated if a water purifier of the invention is used for waters of an extremely low $Cl^-$ concentration. On the other hand, a high $Cl^-$ concentration leads to decrease in the bactericidal effect. We have contemplated that these problems will be solved by controlling the pH value of the water in the purifier. The above mentioned Standards specify that the pH value should be in the range from 5.8 to 8.6, and ordinarily drinking water has a value near 7.0. Although neutrality is a desirable property for drinking use, it is at the same time best suited to propagate bacteria. In a slightly acidic or alkaline water the propagation of bacteria is remarkably suppressed, but an acidic water is undesirable because of an increase in $Ag^+$ concentration and in corrosive property, in addition to the ill effect to the human body.

Figure 5:
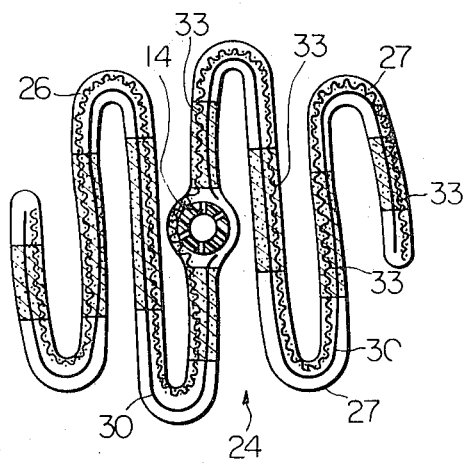
FIG. 5 is a schematic cross-sectional view of another preferred embodiment of a filter cloth unit of a water purifier of the invention.

In a water purifier of another embodiment of the invention, some portions of the interior space of the filter unit 24 are as shown cross-sectionally in FIG. 5, filled with granules 33 of a sparingly water soluble alkaline substance to slightly increase the pH value of the dechlorinated water. The alkaline substance 33 should naturally be a harmless substance with no effect on taste and odor, and the most preferred one is calcium carbonate which has been used as a food additive. Other suitable examples are polyphosphates, polysilicates and aluminous cements. To prevent excessive dissolution into and mixing with the treated water, the alkaline compound 33 is preferably packed into the selected regions in the form of rigid granule or tablets.

The curve II in FIG. 6 shows a relationship of the $Ag^+$ concentration to the $Cl^-$ concentration when the pH value of the dechlorinated water is increased up to about 8 in a water purifier of FIG. 5. In this instance, the $Ag^+$ concentration is maintained below the specified limit even when the supplied water contains practically no chlorine ions.

Figure 7:
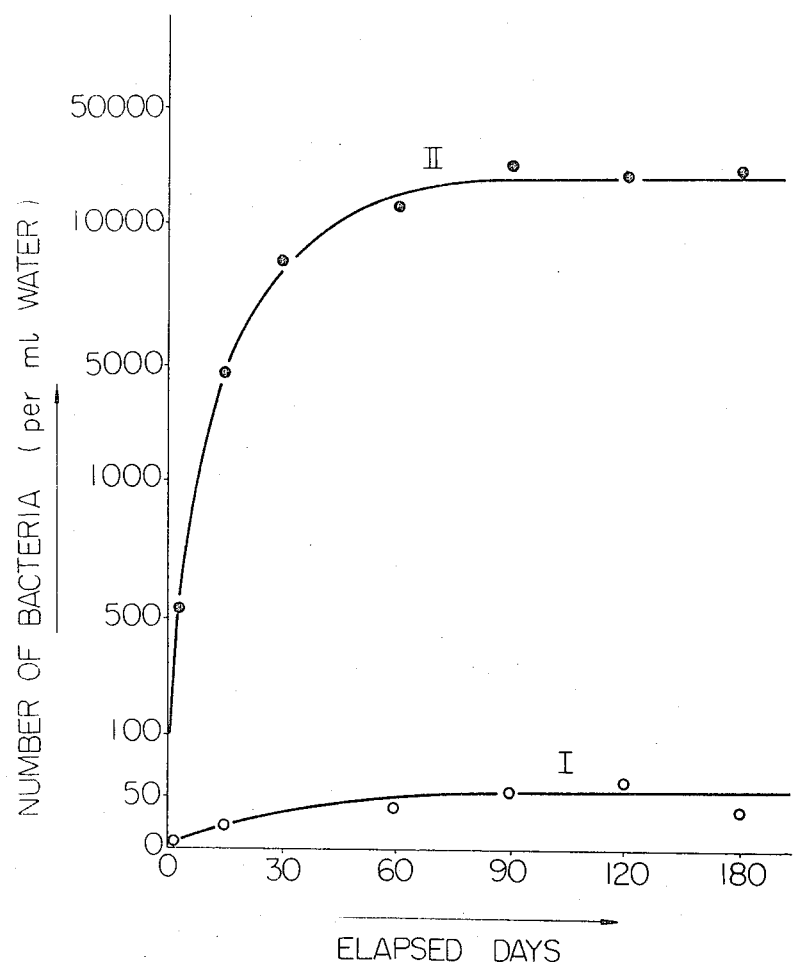
FIG. 7 is a graph showing the number of bacteria observed in the water from water purifier of the invention and from a prior art purifier.

A remarkable bactericidal power of a water purifier according to the invention will be perceived from the curves in FIG. 7, which show the number of bacteria observed in the treated water from two purifiers; one according to the invention and the other a conventional one. A water purifier having a filter unit of FIG. 5 and a conventional water purifier, which was similar to the former in general construction except that the membrane 30 and the granule 33 were not included, were operated every 15 days, treating each time 30 liters of city water. During non-operated periods, the purifiers were left water-filled, and at each operation 1 ml of sample water was taken from 200 ml of retained water drained at the beginning of each operation. The number of living bacteria in each water sample was determined by the standard agar nutrient medium method. The curves I and II represent the results when a purifier according to the invention and a conventional one, rspectively, were used.

What is claimed is:

1. In a water purifier having absorption means to dechlorinate potable water supplied thereto, a filter assembly to filter and sterilize the water, comprising two layers of filter cloth joined with each other to form a space therebetween, a water conduit communicating with said space and with an outlet of the purifier, at least one sheet of a synthetic fiber non-woven cloth having a thickness of 0.01 to 5 mm and coated and impregnated with a bactericidal substance and arranged in said space to be substantially opposite the entire inner surfaces of said filter cloth layers, and at least one support member having a multiplicity of openings to allow water to flow freely therethrough arranged in said space to prevent said sheet from contacting said filter cloth layers, so that said sheet is exposed to the filtered water and exerts a bactericidal action thereon.

2. A filter assembly as claimed in claim 1, in which said bactericidal substance is silver chloride.

3. A filter assembly as claimed in claim 2, and further comprising granular calcium carbonate in at least a portion of said space in such an amount that the pH value of the filtrated water is increased up to 8.6 thereby to maintain the silver ion concentration therein below 50 ppb.

* * * * *